US008104584B2

(12) United States Patent
Piedra et al.

(10) Patent No.: US 8,104,584 B2
(45) Date of Patent: Jan. 31, 2012

(54) ELEVATOR DRIVE CONTROL STRATEGY

(75) Inventors: Edward Piedra, Holyoke, MA (US); Ismail Agiman, Southington, CT (US); Daryl Marvin, Shanghai (CN)

(73) Assignee: Otis Elevator Company, Farmington, CT (US)

( * ) Notice: Subject to any disclaimer, the term of this patent is extended or adjusted under 35 U.S.C. 154(b) by 341 days.

(21) Appl. No.: 12/096,181

(22) PCT Filed: Dec. 20, 2005

(86) PCT No.: PCT/US2005/046217

§ 371 (c)(1), (2), (4) Date: Jun. 5, 2008

(87) PCT Pub. No.: WO2007/073368

PCT Pub. Date: Jun. 28, 2007

(65) Prior Publication Data

US 2008/0277209 A1 Nov. 13, 2008

(51) Int. Cl.
*B66B 1/28* (2006.01)
*H02P 21/00* (2006.01)

(52) U.S. Cl. .................... 187/290; 318/400.02; 318/806

(58) Field of Classification Search .................. 187/288, 187/290, 296; 318/700, 719–721, 798, 799, 318/806–812

See application file for complete search history.

(56) References Cited

U.S. PATENT DOCUMENTS

| | | | | |
|---|---|---|---|---|
| 4,640,389 | A | 2/1987 | Kamaike | |
| 4,680,526 | A * | 7/1987 | Okuyama et al. | 318/802 |
| 5,341,081 | A | 8/1994 | Yamada | |
| 5,629,597 | A * | 5/1997 | Imanaka | 318/805 |
| 5,698,823 | A * | 12/1997 | Tanahashi | 187/296 |
| 5,909,018 | A * | 6/1999 | Vecchiotti et al. | 187/393 |
| 5,929,400 | A * | 7/1999 | Colby et al. | 187/393 |
| 6,429,620 | B2 * | 8/2002 | Nakazawa | 318/701 |
| 6,492,788 | B1 * | 12/2002 | Agirman et al. | 318/700 |
| 7,042,227 | B2 * | 5/2006 | Mir et al. | 324/503 |
| 2002/0105335 | A1 * | 8/2002 | Mir et al. | 324/503 |
| 2006/0049792 | A1 * | 3/2006 | Chen et al. | 318/716 |
| 2006/0145652 | A1 * | 7/2006 | Ta et al. | 318/807 |
| 2007/0085507 | A1 * | 4/2007 | Tobari et al. | 318/710 |
| 2007/0284196 | A1 * | 12/2007 | Sakai et al. | 187/305 |
| 2009/0071735 | A1 * | 3/2009 | Kaneko et al. | 180/65.285 |
| 2010/0060222 | A1 * | 3/2010 | Kezobo et al. | 318/490 |

FOREIGN PATENT DOCUMENTS

| | | |
|---|---|---|
| EP | 173146 A1 | 12/2006 |
| JP | 63023752 B | 5/1988 |
| JP | 11229819 | 8/1998 |

OTHER PUBLICATIONS

International Search Report and Written Opinion of the International Searching Authority for International application No. PCT/US05/46217 mailed Jan. 19, 2007.

International Preliminary Report on Patentability for International application No. PCT/US05/46217 mailed Jul. 3, 2007.

* cited by examiner

*Primary Examiner* — Eduardo Colon

(74) *Attorney, Agent, or Firm* — Carlson, Gaskey & Olds PC

(57) ABSTRACT

An elevator drive assembly (30) includes a voltage regulator (40) that selectively introduces current under certain conditions. In one example, the voltage regulator (40) introduces a negative flux current to an electric motor (32) when the motor (32) is operating under conditions corresponding to constant speed movement of an elevator car (22). In one example, the added negative flux current effectively reduces the back-EMF voltage of the motor (32) during the constant velocity portion of an elevator run. A disclosed example includes controlling the added current to maintain control over a motor torque constant, which becomes a function of the added current.

23 Claims, 3 Drawing Sheets

ELEVATOR DRIVE CONTROL STRATEGY

FIELD OF THE INVENTION

This invention generally relates to elevator systems. More particularly, this invention relates to controlling a drive in an elevator system.

DESCRIPTION OF THE RELATED ART

Elevator systems typically include a drive assembly that is responsible for the movement of the elevator car. Typical drives include a drive portion having electronics for controlling the power and command signals provided to a motor. Most arrangements include electric motors that cause desired movement of an elevator car responsive to the signals and power provided through the drive.

The duty speed, duty acceleration and duty load for a given elevator system are limited based upon the power capability of the drive assembly (e.g., the drive portion and the motor). The power of the drive portion is defined by its voltage and current capability. Voltage capabilities of elevator system drive portions are typically fixed so that the drive portions are typically rated by current capability. Controlling the motor, therefore, requires that the maximum sinusoidal output voltage of the drive not be exceeded. The maximum voltage level is typically based on the drive portion DC bus voltage level. Many examples include a bus voltage that is regulated to 750 VDC, for example. That voltage level is typically 10% higher than the rectified AC line input to the drive. In some examples, the DC bus voltage is not regulated such that it corresponds to the rectified main AC lined input.

The power of the motor is defined by its torque and speed capability. A typical approach is to design a motor to have a rated voltage as close as possible to the drive sinusoidal output voltage limit. This approach is usually taken to minimize the rated current of the motor and the drive. There are several disadvantages associated with this approach. The weighted voltage of the motor has to be set below the maximum sinusoidal output of the drive because of several factors, including inaccuracies in the DC bus sense circuitry, voltage transients during the peak power operating point of an elevator run, and AC line fluctuations. Lowering the rated voltage of the motor to accommodate such factors results in increasing the accelerating current rating of the drive. Such an increase causes an increase in cost of the drive. The accelerating current rating of the drive is the maximum amount of current allowed from the drive during the acceleration of a fully loaded elevator car moving in an up direction to approach full speed. The accelerating current rating is critical because the predicted lifetime of the drive is based on that rating.

Having an increased accelerating current rating also requires more robust or larger switching devices to accommodate corresponding power levels. This introduces additional cost into an elevator drive assembly, which is disadvantageous.

There is a need for an improved elevator drive control strategy that allows for reducing the drive accelerating current requirement. It would be beneficial to provide a control strategy that increases the drive lifetime and enhances the ability of a given drive to accommodate higher duty loads and faster duty speeds compared to previous arrangements. This invention provides such a control strategy.

SUMMARY OF THE INVENTION

An exemplary method of controlling an elevator drive assembly that has an electric motor includes selectively adding a current out of phase with an EMF voltage of the electric motor.

In one example, the added current is supplied when the motor operation corresponds to an associated elevator car moving at a constant velocity. In some examples, the elevator car is moving at full speed and fully loaded before the current is added.

One example includes controlling the added current to control a torque constant of the motor, which becomes dependent on the added current.

Another example method includes determining whether an elevator car is moving at a constant speed. If so, a negative flux current is introduced through the drive, which effectively reduces the back-EMF voltage of the motor and increases the amount of current. In some examples, this allows for increasing motor speed without adversely impacting the accelerating current rating of the elevator drive assembly.

An example elevator drive includes a voltage regulator that selectively introduces a negative d-axis current to a motor if the motor operation corresponds to an elevator car moving at a constant speed.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
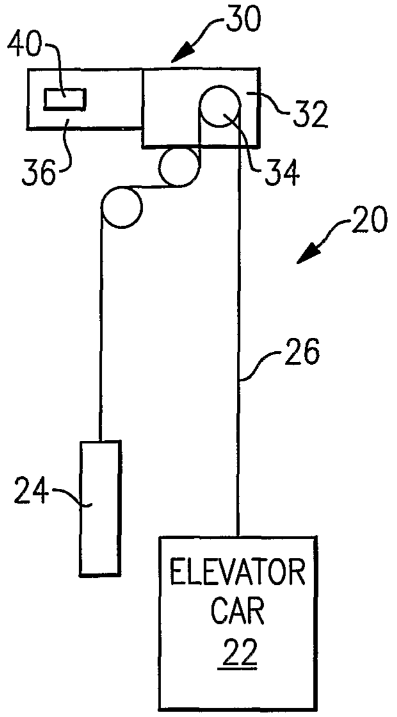
FIG. 1 schematically illustrates selected portions of an elevator system including a drive assembly designed according to an embodiment of this invention.

FIG. 1 schematically illustrates selected portions of an elevator system 20. An elevator car 22 and counterweight 24 are supported by roping 26 (e.g., belts or ropes) in a known manner. An elevator drive assembly 30 is responsible for controlling movement of the elevator car 22 in a desired manner. The illustrated example includes a motor 32 that controls rotation of a traction sheave 34 to cause corresponding movement of the roping 26 which results in the desired movement of the elevator car 22.

A drive portion 36 is responsible for providing power and command signals for operating the motor 32 to achieve the desired elevator system operation. The example drive portion 36 includes known components (not illustrated) for receiving power from a power supply and providing appropriate power to the motor 32.

One feature of the example drive portion 36 is a voltage regulator 40 that provides unique control over the current supplied to the motor 32. In one example, the voltage regulator 40 selectively adds a current that is out of phase with a back-EMF voltage of the motor 32 under selected conditions and which provide several benefits.

Figure 2:
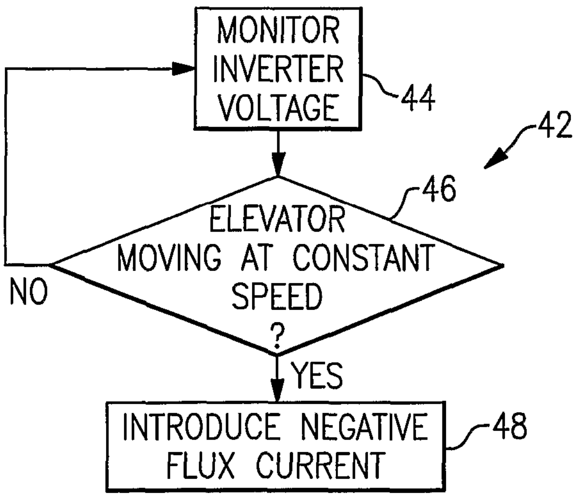
FIG. 2 is a flowchart diagram summarizing one example approach for controlling an elevator drive according to an embodiment of this invention.

FIG. 2 includes a flowchart diagram 42 summarizing one example approach. In this example, the voltage regulator 40 monitors the inverter voltage associated with the drive portion 36 as schematically shown at 44. That inverter voltage provides an indication of whether the motor 32 is operating under conditions that correspond to constant speed movement of the elevator car 22. In FIG. 2, at 46, the voltage regulator 40 determines whether the elevator car 22 is moving at a constant speed. In one example, constant speed when the elevator is moving in an upward direction under relatively fully loaded conditions is an appropriate circumstance for selectively adding the current supplied to the motor. In FIG. 2, at 48, the voltage regulator 40 introduces a negative flux current under such conditions. The added current is out of phase with the back-EMF voltage of the motor 32. The added current can be considered a negative d-axis current.

Such voltage regulation adds current to the motor but does not affect the accelerating current rating of the drive portion 36 because the voltage regulator 40 only adds such current at or near full speed when acceleration is low. Adding current to the motor 32 during a constant velocity portion of an elevator run in this manner has negligible effect on the lifetime of the drive assembly 30.

The example approach allows for increasing the voltage rating of the motor 32 and lowering the current rating of the drive portion 36. Lowering the accelerating current rating of the drive portion 36 allows for using smaller switching devices (e.g., isolated gate bipolar transistors (IGBTs)), which has the advantage of reducing the cost of the drive assembly 30 in some examples.

In one example, the voltage regulator 40 is programmed to be active only during elevator runs that include full speed upward elevator car movement during a motoring condition very close to full load. During a full speed elevator up run with a full load in the car, one example voltage regulator 40 remains inactive until a magnitude of the drive portion 36 inverter voltage squared reaches a selected threshold. The elevator velocity profile has a discernable point when it transitions from a constant acceleration region of the elevator run into a constant velocity region, which is sometimes referred to as a jerk-into-constant-velocity region. One example includes selecting the threshold for activating the voltage regulator 40 based upon knowledge of that transition.

While the elevator car 22 is moving at a constant speed, the required drive current decreases because acceleration decreases. In one example, under these conditions, the voltage regulator 40 becomes active and introduces a negative flux current, which increases the total current of the drive portion 36 and the motor 32. Even with such added current, the total current level is lower than the accelerating current level in many examples. The voltage regulator 40 remains active during the constant velocity portion of the elevator run. In some examples, the negative flux current introduced by the voltage regulator 40 is used throughout the constant velocity portion of the elevator run.

Such an approach has several advantages. In one example, the cost of the drive assembly 30 is reduced because the drive accelerating current requirement for a given elevator duty is lowered. Reducing the drive accelerating current requirement for a given elevator duty also introduces a longer drive lifetime in some examples. Additionally, for a given drive assembly 30, the elevator duty load and elevator duty speed can be increased when implementing an example embodiment of this invention.

Motor inductance exists in the circuit between the back-EMF of the motor 32 and the switching IGBT's of the drive portion 36 to enable control of the phase currents. By properly switching the IGBT's, the applied voltage at the IGBT's can be controlled. The applied voltage in one example is:

$$\vec{V}_{dq} = \sqrt{\frac{2}{3}}\,\vec{V}_{emf} + j\omega_e L\vec{I}$$

where $\vec{V}_{dq}$ is the voltage vector applied at the inverter;

$\vec{V}_{emf}=V_{emf}+j0$ is the voltage vector of the motor back-EMF (in line-line rms);

$\vec{I}=I_q+jI_d$ is the current vector in the inverter;

$\omega_e$ is the electrical frequency of the motor; and

L is the inductance of the motor (neglecting saliency).

The typical approach includes operating the inverter using a unity power factor by holding the component of the current vector which is out-of-phase with the motor back-EMF to zero (i.e., $I_d=0$). Controlling the motor speed then depends on using the component of the current vector which is in-phase with the motor back-EMF (i.e., $I_q$). In one example, the applied voltage is:

$$\vec{V}_{dq} = \sqrt{\frac{2}{3}}\,V_{emf} + j\omega_e L I_q$$

Figure 3:
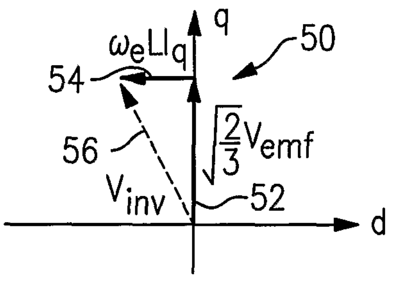
FIG. 3 graphically illustrates an example control voltage.

FIG. 3 graphically represents the $V_{dq}$ vector resulting from keeping the out-of-phase current component ($I_d$) at zero. The $\vec{V}_{dq}$ vector in this example has an EMF component 52 and an $I_q$ component 54 resulting in an inverter voltage $V_{inv}$ 56. The $\vec{V}_{dq}$ vector has a magnitude of:

$$|\vec{V}_{dq}| = \sqrt{\left(\sqrt{\frac{2}{3}}\,V_{emf}\right)^2 + (\omega_e L I_q)^2}$$

However, the magnitude of the voltage applied to the inverter ($|\vec{V}_{dq}|$) at the IGBT's is limited to ($v_{bus}/\sqrt{3}$). As a result, the maximum motor back-EMF voltage that can be used and still enable current control is:

$$V_{emf\_max} = \sqrt{\frac{3}{2}}\sqrt{\left(\frac{V_{bus}}{\sqrt{3}}\right)^2 - (\omega_e L I_q)^2}\,.$$

This limit helps define the maximum motor speed of a particular drive and motor pair, for example.

This invention includes departing from the typical approach under selected circumstances such as during constant speed operation of the motor 32 corresponding to a constant speed of movement of the elevator car 22. This example includes adding current corresponding to the component of the current vector which is out of phase with the motor back-EMF voltage during the constant speed conditions. In other words, $I_d$ is not held to zero when the elevator car 22 is traveling at a constant speed. In one example, the added current is only provided when the elevator car 22 is heavily loaded and traveling in an upward direction.

If $I_d$ is not zero, the magnitude of the inverter voltage can be written as:

$$\begin{aligned} V_{dq}^2 &= \left(\sqrt{\frac{2}{3}}V_{emf} - \omega_e L I_d\right)^2 + (\omega_e L I_q)^2 \\ &= \left(\sqrt{\frac{2}{3}}V_{emf}\right)^2 + (\omega_e L I_q)^2 - \omega_e L I_d\left(2\sqrt{\frac{2}{3}}V_{emf} - \omega_e L I_d\right) \\ &= \left[\left(\sqrt{\frac{2}{3}}V_{emf}\right)^2 + (\omega_e L I_q)^2\right] - \left(2\omega_e L\sqrt{\frac{2}{3}}V_{emf}\right) I_d \end{aligned}$$

Using this approach and properly controlling the current which is out of phase with the back EMF of the motor allows reducing the inverter voltage without sacrificing motor speed. In some examples, reducing the inverter voltage includes increasing the motor speed. This technique effectively allows reactive power to flow through the motor 32, which creates a voltage drop that is in phase with the back-EMF of the motor 32. In one example, modeling the right most terms in the approximation above (i.e., $2\omega_e L\sqrt{2/3}V_{emf}$) provides a basis for a voltage regulator to achieve a desired motor operation.

Figure 4:
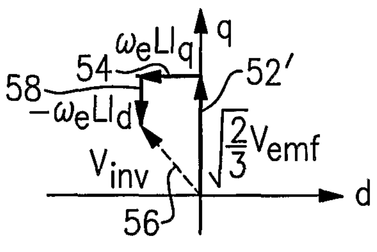
FIG. 4 graphically illustrates another example control voltage.

FIG. 4 shows the resulting $V_{dq}$ Vector 56 when $I_d$ is not zero. By controlling $I_d$ under appropriate conditions (e.g., during constant speed conditions), $V_{inv}$ can be kept within a desired range or below a selected limit. This approach allows reducing $V_{inv}$, increasing current input and potentially increasing motor speed. In the illustration, the $V_{inv}$ component 652' is smaller than the $V_{inv}$ 652 of FIG. 3. The added $I_d$ voltage component 58 is in phase with the $V_{emf}$ 52', resulting in the decreased voltage $V_{inv}$. This approach reduces $V_{inv}$ 652' but does not require increasing the accelerating current rating of the drive assembly 30 because the motor 32 is operating near full speed and acceleration is low.

In examples having a current controller designed to operate in the synchronous reference frame, $V_{dq}^2$ can be determined from the output of the current regulators as:

$$V_{dq}^2 = V_{de}^2 + V_{qe}^2$$

Figure 5:
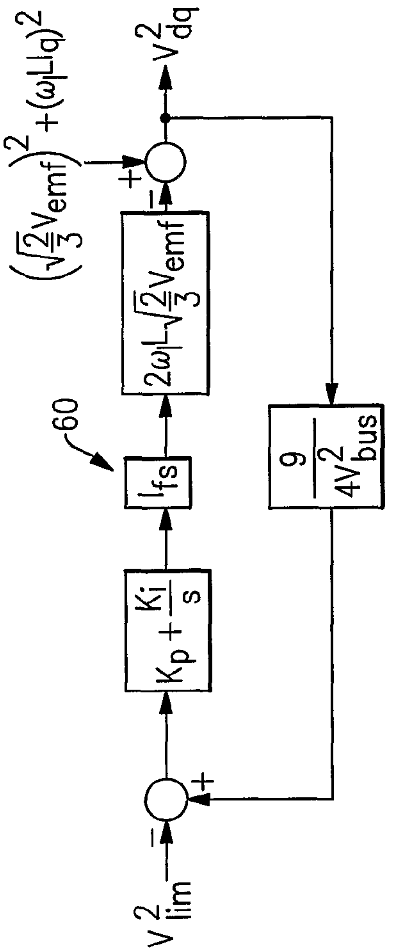
FIG. 5 schematically illustrates a control loop useful for voltage control in one example embodiment.

FIG. 5 shows an example control loop 60 for controlling $V_{dq}^2$ such that it does not exceed the maximum permissible value $$\left(\frac{V_{bus}^2}{3}\right).$$

The functional blocks shown in FIG. 5 may be realized using software, hardware, firmware or a combination of them. Given this description, those skilled in the art will be able to implement the functions of the blocks schematically shown in FIG. 5 in a manner that meets their particular needs. Using the approximation for $V_{dq}^2$ as shown above, one example control loop consistent with FIG. 5 does not account for loop delays, motor saliency, current loop dynamics, etc. However, since the bandwidth requirements of the control loop are so low, these details should be negligible if relatively low controller gains are used.

Referring to FIG. 5, the open loop transfer function is:

$$G(s) = \left(K_p + \frac{K_i}{s}\right)\left(2\omega_1 L\sqrt{\frac{2}{3}}V_{emf}\right)\left(\frac{9 \cdot I_{fs}}{4V_{bus}^2}\right)$$

To achieve a cross-over frequency of $f_{bw}$, the controller gains in one example are selected as follows:

$$K_p = 0$$

$$K_i = \left(\frac{2}{3 f_1 L\sqrt{6}\, V_{emf}}\right)\left(\frac{V_{bus}^2}{I_{fs}}\right) f_{bw}$$

The equation for the back-EMF is given by:

$$\sqrt{\frac{2}{3}}V_{emf} = \omega_e \lambda_m$$

where $\lambda_m$ is the back-EMF constant of the motor 32. This back-EMF constant ($\lambda_m$) can be calculated using the torque constant ($K_t$) equation for a permanent magnet motor in one example, which is:

$$K_t = \frac{\tau_r}{I_{qr}} = \frac{3}{2}\frac{\#p}{2}[\lambda_m + (L_d - L_q)\cdot I_d]$$

where

#p is the number of machine poles;

$\tau_T$ is the rated torque of the machine; and $I_{qr}$ is the rated torque current of the machine.

Neglecting saliency (i.e., assuming $L_d - L_q = 0$) yields:

$$K_t = \frac{3}{2}\frac{\#p}{2}\lambda_m \text{ or } \lambda_m = \frac{4}{3}\frac{K_t}{\#p}$$

such that $$V_{emf} = \frac{4}{3}\frac{K_t \omega_e}{\#p}$$

One example includes a proportional integral regulator that provides pure integral control for stability of the controller of the drive 36. This avoids stability problems that would otherwise be caused by any amount of proportional gain, since the example approach is based on an algebraic equation.

One example includes a limit placed in the integrator which limits the output (and integrator state) to be greater than zero. This will only enable reactive power to flow when it is required to lower the voltage needed to increase the motor speed. In one example, the limit is selected such that the integrator and the voltage regulator 40 of the drive 36 only provides control during constant speed conditions when the elevator car 22 is traveling upward and heavily loaded (e.g., at or near the duty load of the car).

The reference value for the example voltage regulator portion 40 is the desired upper limit on the amplitude squared of the output voltage. Therefore, to limit the output voltage to 98% of the capability of the drive $$\left(\frac{V_{bus}}{\sqrt{3}}\right)$$

in one example, the reference value ($V_{lim}^2$) is set to 0.9604 and then adjusted by a factor that accounts for the full-scale voltage $$\left(\frac{2V_{bus}}{3}\right).$$

This is determined in one example using:

$$V_{lim}^2 = 0.9604\left(\frac{V_{bus}^2}{3}\right)\left(\frac{9}{4V_{bus}^2}\right) = 0.9604\left(\frac{3}{4}\right) = 0.7203$$

For permanent magnet motors, the motor equations are given by:

$$V_q=R_sI_q+d/dt\lambda_q+\omega_e\lambda_d$$

$$V_d=R_sI_d+d/dt\lambda_d-\omega_e\lambda_q$$

where $\lambda_d$ is the d-axis flux $\lambda_q$ is the q-axis flux

Assuming the flux vs. current is linear ($\lambda$=LI), the motor equations become $$\lambda_q=R_sI_q+L_qd/dtI_q+\omega_eL_dI_d+\omega_e\lambda_m$$

$$V_d=R_sI_d+L_dd/dtI_d\omega_eL_qI_q$$

For current regulation, L is known and the same for the transient voltage ( $$L\frac{d}{dt}I$$

) and the steady state voltage ($\omega_e$LI). The transient voltage L (or differential L) would already be calculated for proper current regulation. This differential L would be valid for calculating the integral gain $K_i$ of the voltage regulator 40. The integral gain in one example is given by:

$$K_i=\left(\frac{\omega_{bw}}{2\omega_e^2L_d\lambda_m}\right)$$

where $\int_{bw}$=the desired bandwidth of the regulator;

$\omega_e$=the electrical frequency of the motor at rated speed;

$\lambda_m$=the flux linkage established by the magnets of the motor; and $L_d$=the d-axis inductance of the motor.

Figure 6:
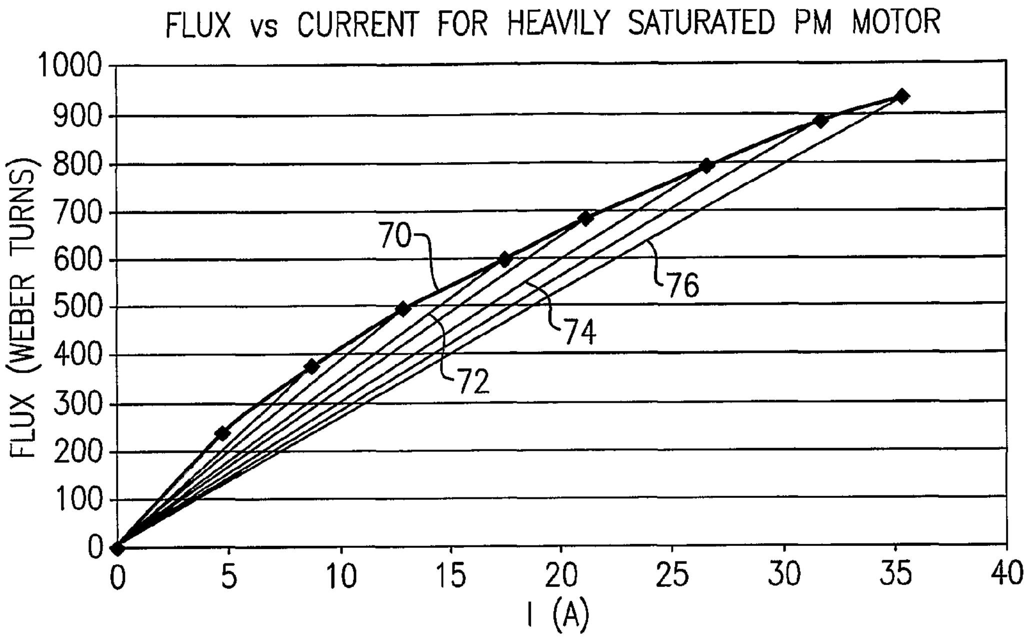
FIG. 6 graphically illustrates a relationship between flux and current for an example electric motor.

But for permanent magnet motors where the flux heavily saturates the motor iron, the flux vs. current curve typically is not linear. As a result, the differential L is different than the steady state voltage L (or bulk L). A typical flux curve with different values for the differential L and bulk L is shown in FIG. 6. In this figure the slope of the curve 70 is the differential L. The slope of the straight lines 72, 74, 76, etc., that extend between zero and the differential L curve 70 are the different values for the bulk L. Only some of the lines indicating bulk L values are labeled in the illustration.

The voltage regulator 40 in one example uses a tuning procedure to determine the d-axis bulk inductance value ($L_d$) of a heavily saturated permanent magnet motor. This is accomplished in one example by injecting white noise into the regulator and measuring the frequency response of the voltage-error-signal-to-the-motor-voltage transfer function using known techniques and varying the estimation of the bulk $L_d$ until the desired field voltage regulator bandwidth matches the actual regulator bandwidth.

Figure 7:
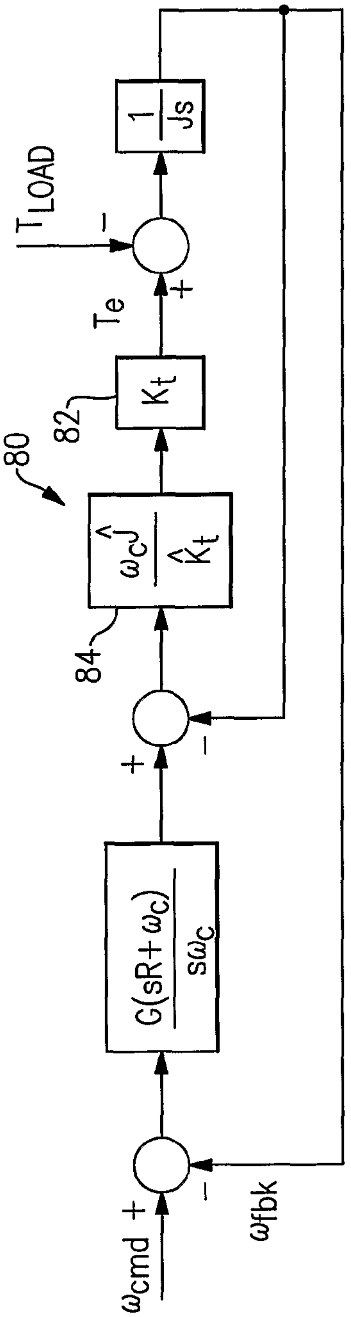
FIG. 7 schematically illustrates a control loop for inner loop velocity control one example embodiment.

Estimating the back emf voltage for the integral gain calculation of the voltage regulator 40 in one example includes ignoring the effect of saliency (e.g., $L_q$>>$L_d$). For the inner velocity loop proportional gain calculation, which depends on knowing the torque constant of the motor, the effect of motor saliency is taken into account in one example for proper velocity control. FIG. 7 schematically shows an example velocity control 80.

The $K_t$ block 82 in this example is part of the motor model while the $$\frac{\omega_c J}{\hat{K}_t}$$

block 84 is the inner velocity loop regulator proportional gain $K_{in}$. When $I_d$ is non-zero, the motor saliency becomes part of the torque equation. The torque constant ($K_t$) is given by:

$$K_t=\frac{T}{I_q}=\frac{3}{2}\frac{\#p}{2}[\lambda_m+(L_d-L_q)I_d]$$

In this example, $K_t$ becomes a function of $I_d$, where $I_d$ is the current selectively added by the voltage regulator 40. In one example, the output of the voltage regulator 40 is always negative (based on the magnet and rotor geometry of the motor 32). As $I_d$ increases in the negative direction, $K_t$ will increase. Also, as $I_d$ increases in the negative direction, $1/K_t$ decreases. In one example, a linear relationship is used to describe the effect of $I_d$ on $1/K_t$ by measuring the bandwidth of the inner velocity loop open loop response as a function of $I_d$. This relationship is then used to modify $K_{in}$.

Figure 8:
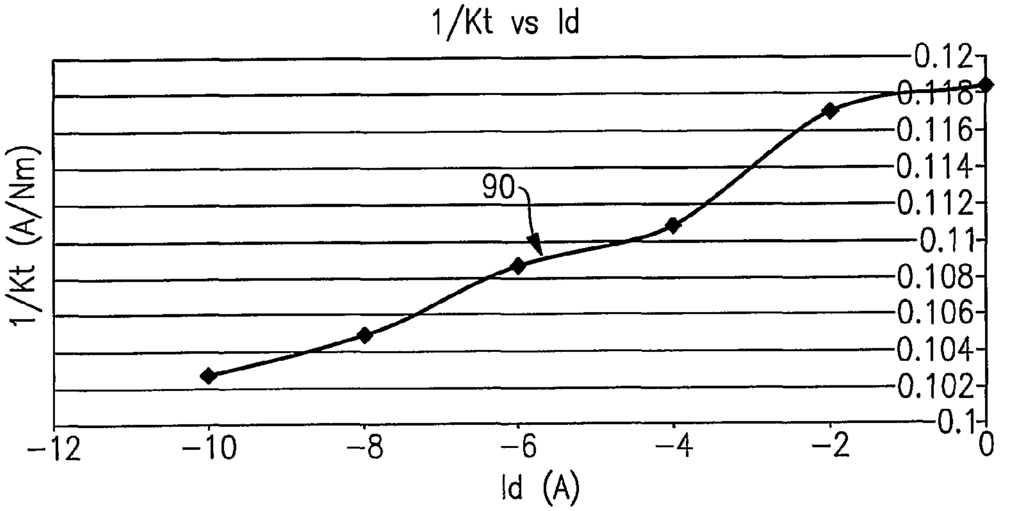
FIG. 8 graphically illustrates a relationship between a torque constant and a d-axis current for one example motor.

FIG. 8 shows a typical $1/K_t$ vs. $I_d$ plot 90 for one example motor 32. Using this relationship, the inner velocity loop gain $K_{in}$ can be modified accordingly to track the change in $K_t$ as a function of $I_d$. This will help maintain the bandwidth of the inner velocity loop regulator for more stable velocity control. In other words, the example includes controlling how much the inner velocity control loop bandwidth changes by controlling the inner velocity control loop gain. Given this description, those skilled in the art will realize what limitations on such a control strategy will best meet their particular needs.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of controlling an elevator drive assembly having a drive portion and an electric motor, comprising:

providing current to the electric motor to achieve a desired motor operation; and intentionally adding a current to the electric motor in addition to the provided current, wherein the added current is out of phase with an emf voltage of the electric motor.

2. The method of claim 1, wherein the motor operation corresponds to an acceleration that is below a selected threshold.

3. The method of claim 1, wherein the motor operation corresponds to an associated elevator car moving at a constant velocity.

4. The method of claim 3, wherein the constant velocity corresponds to the associated elevator car moving in an upward direction at a constant speed.

5. The method of claim 3, comprising determining whether an inverter voltage of the drive portion is below a corresponding threshold.

6. The method of claim 5, comprising determining whether the inverter voltage squared is below the corresponding threshold.

7. The method of claim 1, comprising determining an amount of the added current based upon a relationship between the added current and a torque constant of the motor to maintain the torque constant within a desired range.

8. The method of claim 1, comprising maintaining a voltage at an inverter of the drive portion relatively constant while adding the added current.

9. The method of claim 1, wherein the added current comprises a negative d-axis current.

10. The method of claim 1, wherein the added current increases current to the motor.

11. A method of controlling a motor in an elevator system, comprising providing current to the electric motor to achieve a desired motor operation; and intentionally providing a negative flux current to the motor in addition to the provided current to thereby increase current to the motor if an associated elevator car is moving responsive to motor acceleration that is below a selected threshold.

12. The method of claim 11, comprising providing the negative flux current if the elevator car is moving in an upward direction and the motor is operating under a fully loaded condition.

13. The method of claim 11, comprising determining if the elevator car is moving at a constant speed by determining whether a voltage of a drive component is within a selected range.

14. The method of claim 13, wherein the voltage comprises an inverter voltage.

15. The method of claim 14, comprising determining whether the inverter voltage squared exceeds a selected threshold.

16. The method of claim 14, comprising maintaining the inverter voltage within a chosen range while providing the negative flux current.

17. The method of claim 11, wherein the negative flux current is out of phase with a back emf voltage of the motor.

18. The method of claim 11, comprising determining an amount of the negative flux current to provide based upon a relationship between the provided negative flux current and a torque constant of the motor to maintain the torque constant within a desired range.

19. The method of claim 11, wherein the elevator car is moving at a constant speed.

20. An elevator drive, comprising a voltage regulator that provides current to a motor to achieve a desired motor operation and intentionally introduces a negative d-axis current to the motor in addition to the provided current to thereby increase current to the motor if the motor operation corresponds to an acceleration below a selected threshold.

21. The elevator drive of claim 20, wherein the voltage regulator introduces the negative d-axis current in an amount that maintains a torque constant of the motor within a desired range.

22. The elevator drive of claim 20, comprising at least one inverter and wherein the voltage regulator introduces the negative d-axis current if a voltage of the inverter exceeds a selected threshold.

23. The elevator drive of claim 20, wherein the motor operation corresponds to an elevator car moving at a constant speed.

* * * * *

UNITED STATES PATENT AND TRADEMARK OFFICE

CERTIFICATE OF CORRECTION

PATENT NO. : 8,104,584 B2
APPLICATION NO. : 12/096181
DATED : January 31, 2012
INVENTOR(S) : Piedra et al.

It is certified that error appears in the above-identified patent and that said Letters Patent is hereby corrected as shown below:

ON THE TITLE PAGE:

Item 75 Inventor Ismail Agirman's information should read as follows:

--Ismail Agirman, Southington, CT (US)--

Signed and Sealed this
Seventeenth Day of April, 2012

David J. Kappos
*Director of the United States Patent and Trademark Office*